(12) United States Patent
Hosono et al.

(10) Patent No.: US 8,565,808 B2
(45) Date of Patent: Oct. 22, 2013

(54) TRANSMISSION POWER CONTROL SYSTEM, BASE STATION, AND TRANSMISSION POWER CONTROL METHOD

(75) Inventors: Hiroyuki Hosono, Yokohama (JP); Takeshi Terayama, Zushi (JP); Takahiro Hayashi, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 263 days.

(21) Appl. No.: 13/198,957

(22) Filed: Aug. 5, 2011

(65) Prior Publication Data

US 2012/0034947 A1 Feb. 9, 2012

(30) Foreign Application Priority Data

Aug. 5, 2010 (JP) ................................. 2010-176497

(51) Int. Cl.
*H04B 7/00* (2006.01)
(52) U.S. Cl.
USPC ............ 455/522; 455/69; 455/63.1; 455/269; 455/456.6; 455/561; 370/318; 375/144; 173/300
(58) Field of Classification Search
USPC ........... 455/522, 69, 63.1, 13.4, 15, 269, 455, 455/456.1, 456.6, 561; 370/318, 335, 342, 370/351; 375/144; 713/300
See application file for complete search history.

(56) References Cited

U.S. PATENT DOCUMENTS

2005/0220176 A1* 10/2005 Zeira et al. .................... 375/144
2009/0318182 A1   12/2009 Nagato et al.

(Continued)

FOREIGN PATENT DOCUMENTS

EP    2 200 360 A1    6/2010
EP    2 339 888 A1    6/2011

(Continued)

OTHER PUBLICATIONS

Office Action issued May 8, 2012 in Japanese Application No. 2010-176497 (With English Translation).

(Continued)

*Primary Examiner* — Shaima Q Aminzay
(74) *Attorney, Agent, or Firm* — Oblon, Spivak, McClelland, Maier & Neustadt, L.L.P.

(57) ABSTRACT

A transmission power determination system configured to control a transmission power of a radio signal transmitted by a small base station in a mobile communication network including a general base station forming a predetermined cell and the small base station forming a small cell smaller in size than the predetermined cell, the transmission power determination system comprising: a reception power acquisition unit configured to acquire a reception power of a radio signal from one of a different small base station or the general base station, which can be received by the small base station; a determination unit configured to determine one of the different small base station and the general base station which transmits the radio signal acquired by the reception power acquisition unit; a pathloss value calculation unit configured to calculate, when it is determined by the determination unit that the radio signal is transmitted from the different small base station, pathloss value between the different small base station and the small base station based on a difference between a transmission power of the radio signal from the different small base station and the reception power of the radio signal from the different small base station acquired by the reception power acquisition unit; and a transmission power determination unit configured to determine the transmission power of the radio signal transmitted by the small base station, based on the pathloss value calculated by the pathloss value calculation unit.

7 Claims, 6 Drawing Sheets

(56) References Cited

U.S. PATENT DOCUMENTS

| | | |
|---|---|---|
| 2011/0217974 A1 | 9/2011 | Naka et al. |
| 2011/0237286 A1 | 9/2011 | Hosono |

FOREIGN PATENT DOCUMENTS

| | | |
|---|---|---|
| EP | 2 352 344 A1 | 8/2011 |
| JP | 2010-4187 | 1/2010 |
| JP | 2010-62951 | 3/2010 |
| WO | WO 2009/047972 A1 | 4/2009 |
| WO | WO 2010/038839 A1 | 4/2010 |
| WO | WO 2010/061628 A1 | 6/2010 |

OTHER PUBLICATIONS

Extended Search Report issued May 29, 2012 in Europe Application No. 11176693.7.

NEC Group "Adjustable HeNB power setting in MeNB—HeNB deployment", 3GPP TSG-RAN WG1 Meeting #61bis, Jun. 28-Jul. 2, 2010, 3 pages.

"3rd Generation Partnership Project; Technical Specification Group Radio Access Network; Evolved Universal Terrestrial Radio Access (E-UTRA); FDD Home eNode B (HeNB) Radio Frequency (RF) requirements analysis", 3 GPP TR 36.921 V9.0.0, Relase 9, Mar. 2010, 46 pages.

Shinichi Mori, et al., "Field Experiments for Service Area Evaluation in W-CDMA with Receiving Quality Measurement Systems", IEICE General Conference, B-5-34, Mar. 2001, p. 432 (with English translation).

"Technical Specification Group Services and System Aspects; Service requirements for Home Node B (HNB) and Home eNode B (HeNB)", $3^{rd}$ Generation Partnership Project; 3GPP TS 22.220, vol. 11.2.0, Release 11, Jun. 2011, pp. 1-25.

Office Action issued Sep. 4, 2012 in Japanese Application No. 2010-176497 (With English Translation).

* cited by examiner

| TOTAL OF RECEPTION POWER (dBm) | TRANSMISSION POWER (dBm) |
|---|---|
| ~-90 | 10 |
| -90~-95 | 6 |
| -95~-100 | 3 |
| -100~ | 0 |

FIG. 6

TRANSMISSION POWER CONTROL SYSTEM, BASE STATION, AND TRANSMISSION POWER CONTROL METHOD

CROSS REFERENCE TO RELATED APPLICATIONS

This application is based upon and claims the benefit of priority from prior Japanese Patent Application No. 2010-176497, filed on Aug. 5, 2010; the entire contents of which are incorporated herein by reference.

BACKGROUND OF THE INVENTION

1. Field of the Invention

The present invention relates to a transmission power control system that controls transmission power of a radio signal transmitted by a small base station, a base station, and a transmission power control method.

2. Description of Related Art

Conventionally, in a mobile communication system, it is necessary to secure a service quality according to content of a communication request generated irregularly from a mobile station. Therefore, when a mobile communication carrier installs the base station, it is general to design a radio parameter, such as an installation location or a configuration of a base station, based on estimating the size of a service area or the traffic generated within the service area, and a transmission power of a common control channel in a downlink direction transmitted from a base station, by means of simulation (for example, Mori, et al., IEICE General Conference 2001, B-5-34 "W-CDMA Area Evaluation Experiment Using Reception Quality Measurement System" March 2001) or the like.

In recent years, in addition to a general base station for a public communication installed by a mobile communication carrier, the number of small base stations installed at home by a mobile station user (for example, Home NodeBs) such as femto cell increases (for example, see 3GPP TS 22.220, Service requirements for Home NodeBs (UMTS) and Home eNodeBs (LTE)). When the mobile communication carrier designs the aforementioned radio parameter, the installation location of such a small base station also needs to be considered.

However, the small base station can be freely installed by the mobile station user, and thus, it is not realistic to design the radio parameter based on simulation in which installation locations of all the small base stations, for example, are considered. Thus, there is a need of Self Configuration by which a small base station, etc., autonomously set the radio parameter.

For example, it is possible to consider the following method, i.e., the small base station measures a reception level of a common control channel (in W-CDMA system, Common Pilot Channel (CPICH)) transmitted by a peripheral base station (a small base station or a general base station), and based on the measured reception level, a transmission level of a common control channel transmitted by the small base station is determined.

However, the aforementioned self configuration has the following problem. That is, when the small base station determines the transmission level of the common control channel transmitted by the small base station based on the reception level of the common control channel transmitted by the peripheral base station, the transmission level of the common control channel of the small base station needs to increase in order to reduce a quality deterioration at the mobile station caused by the common control channel of the peripheral base station.

There is a problem that if such a process is repeated in the peripheral base station, then the transmission level of the common control channel transmitted by the small base station or peripheral base station increases in the end, and therefore, an interference of a radio signal between the base stations can rather increase.

SUMMARY OF THE INVENTION

A transmission power determination system according to a feature of the present invention is summarized as the transmission power determination system configured to control a transmission power of a radio signal transmitted by a small base station in a mobile communication network including a general base station (base station 203 and base station 204) forming a predetermined cell and the small base station (base station 200 to 202) forming a small cell smaller in size than the predetermined cell, the transmission power determination system comprising: a reception power acquisition unit (reception power acquisition unit 211) configured to acquire a reception power of a radio signal from one of a different small base station or the general base station, which can be received by the small base station; a determination unit (base station classification determination unit 217) configured to determine one of the different small base station and the general base station which transmits the radio signal acquired by the reception power acquisition unit; a pathloss value calculation unit (pathloss value calculation unit 219) configured to calculate, when it is determined by the determination unit that the radio signal is transmitted from the different small base station, pathloss value between the different small base station and the small base station based on a difference between a transmission power of the radio signal from the different small base station and the reception power of the radio signal from the different small base station acquired by the reception power acquisition unit; and a transmission power determination unit (transmission power determination unit 221) configured to determine the transmission power of the radio signal transmitted by the small base station, based on the pathloss value calculated by the pathloss value calculation unit.

In the above described feature, the transmission power determination unit may determine the transmission power of the radio signal transmitted by the small base station based on the reception power of the radio signal from the general base station acquired by the reception power acquisition unit, when it is determined by the determination unit that the radio signal is transmitted from the general base station.

In the above described feature, the transmission power determination unit may determine, as the transmission power of the radio signal transmitted by the small base station, a transmission power having a smaller value, of the transmission power of the radio signal from the small base station determined based on the pathloss value and the transmission power of the radio signal from the small base station determined based on the reception power of the radio signal from the general base station.

In the above described feature, the transmission power determination unit may determine the transmission power of the radio signal transmitted by the small base station so that a reception power of the radio signal from the small base station in a different small base station having the smallest pathloss value is equal to or less than a predetermined threshold value, when there are a plurality of different small base stations that can be received by the small base station.

In the above described feature, the transmission power determination unit may determine the transmission power of the radio signal transmitted by the small base station by adding a predetermined offset value to the reception power of the radio signal from the general base station acquired by the reception power acquisition unit.

DETAILED DESCRIPTION OF THE EMBODIMENTS

Next, an embodiment of the present invention will be described. In the following description of the diagrams, the identical or similar portions are assigned with the identical or similar numerals. However, it should be noted that the drawings are merely exemplary and ratios of each dimension differ from the actual ones.

Therefore, the specific dimensions, etc., should be determined in consideration of the following explanations. Moreover, it is needless to say that relations and ratios among the respective dimensions differ among the diagrams.

(1) Entire Schematic Configuration of Mobile Communication System

Figure 1:
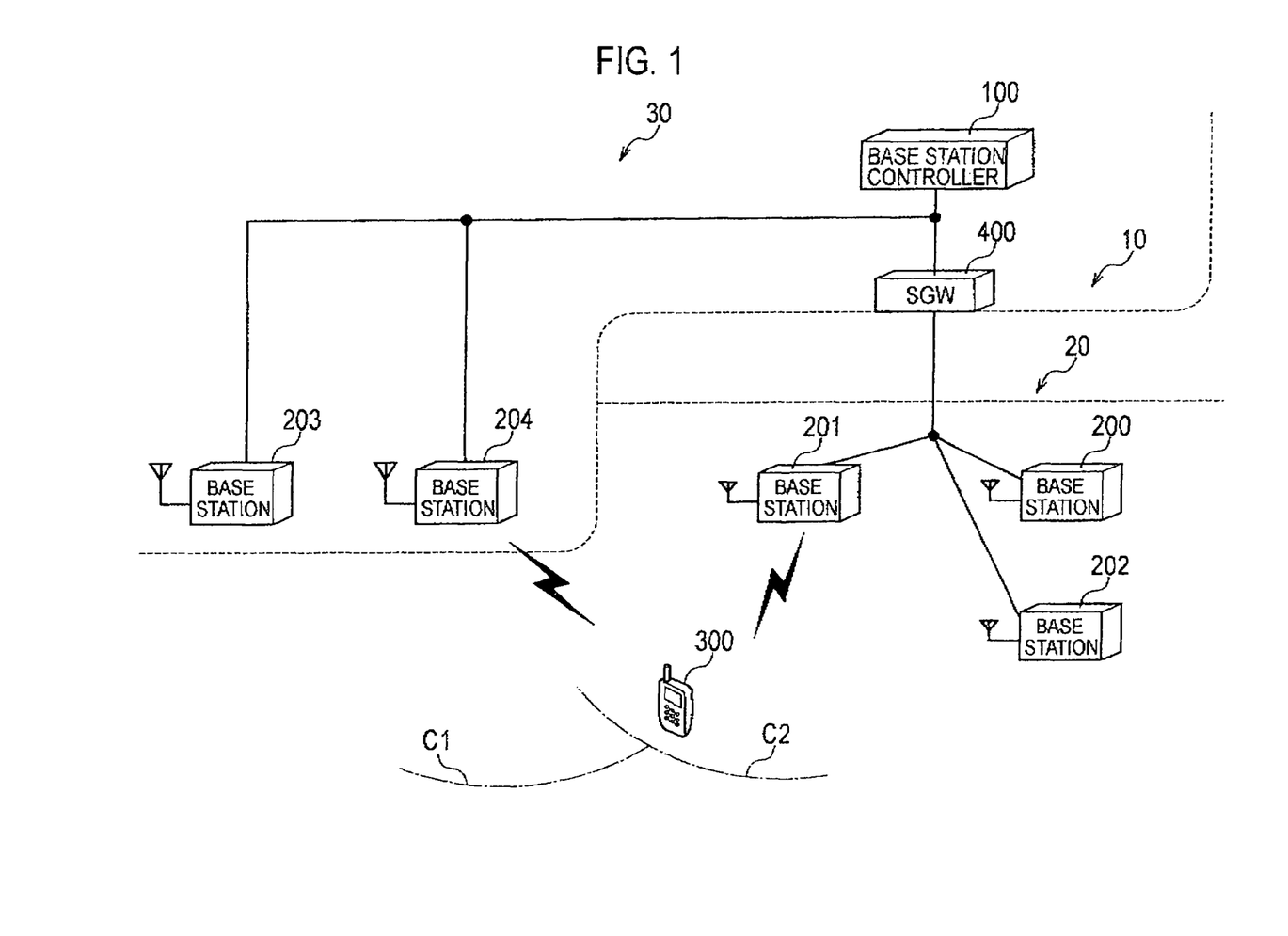
FIG. 1 is a schematic diagram showing the entire configuration of a mobile communication system according to an embodiment of the present invention.

FIG. 1 is a schematic diagram showing the entire configuration of a mobile communication system according to the embodiment. Specifically, FIG. 1 illustrates a configuration example of a typical radio access network in a mobile communication system.

The mobile communication system illustrated in FIG. 1 complies with an LTE scheme, and base stations 200 to 204 are connected to enable communication with a base station controller 100 (MME). The base station controller 100 assigns a radio parameter required by the base station to execute a radio communication with a mobile station 300, to the base stations 200 to 204, and executes management thereof, etc.

The base stations 200 to 202 are small base stations (Home eNodeBs) managed by a user of a communication service offered by a mobile communication carrier. The base stations 200 to 202 are all installed in a Local Area Network (LAN) managed by the user, and connected to the base station controller 100 arranged on a mobile communication carrier network 10, via an access line carrier network 20 offering FTTH and ADSL. A mobile communication network 30 is formed by the mobile communication carrier network 10 and the access line carrier network 20.

At a boundary between the mobile communication carrier network 10 and the access line carrier network 20, Security Gateway (SGW) 400 is installed. The SGW 400 is a gateway configured to protect the mobile communication carrier network 10 from an illegal access from another communication network. The SGW 400 permits only access to the mobile communication carrier network 10 authenticated as genuine by a predetermined authentication procedure.

In this embodiment, it is assumed that the base stations 200 to 202 are each owned by a different user. Thus, a mobile station of a user who manages one base station is not granted a connection permission to the different small base station, On the other hand, the base station 203 and the base station 204 are base stations for a public communication (eNodeBs), and installed on the mobile communication carrier network 10. Any mobile station by a user of a mobile communication carrier can connect to the base station 203 and the base station 204, without any particular limitation.

The base station 203 and the base station 204 configure a general base station forming a cell C1 (predetermined cell). On the other hand, the base stations 200 to 202 form a cell C2 (small cell) smaller in size than the cell C1. In this embodiment, the base stations 200 to 202 configure a small base station.

(2) Functional Block Configuration of Small Base Station

Figure 2:
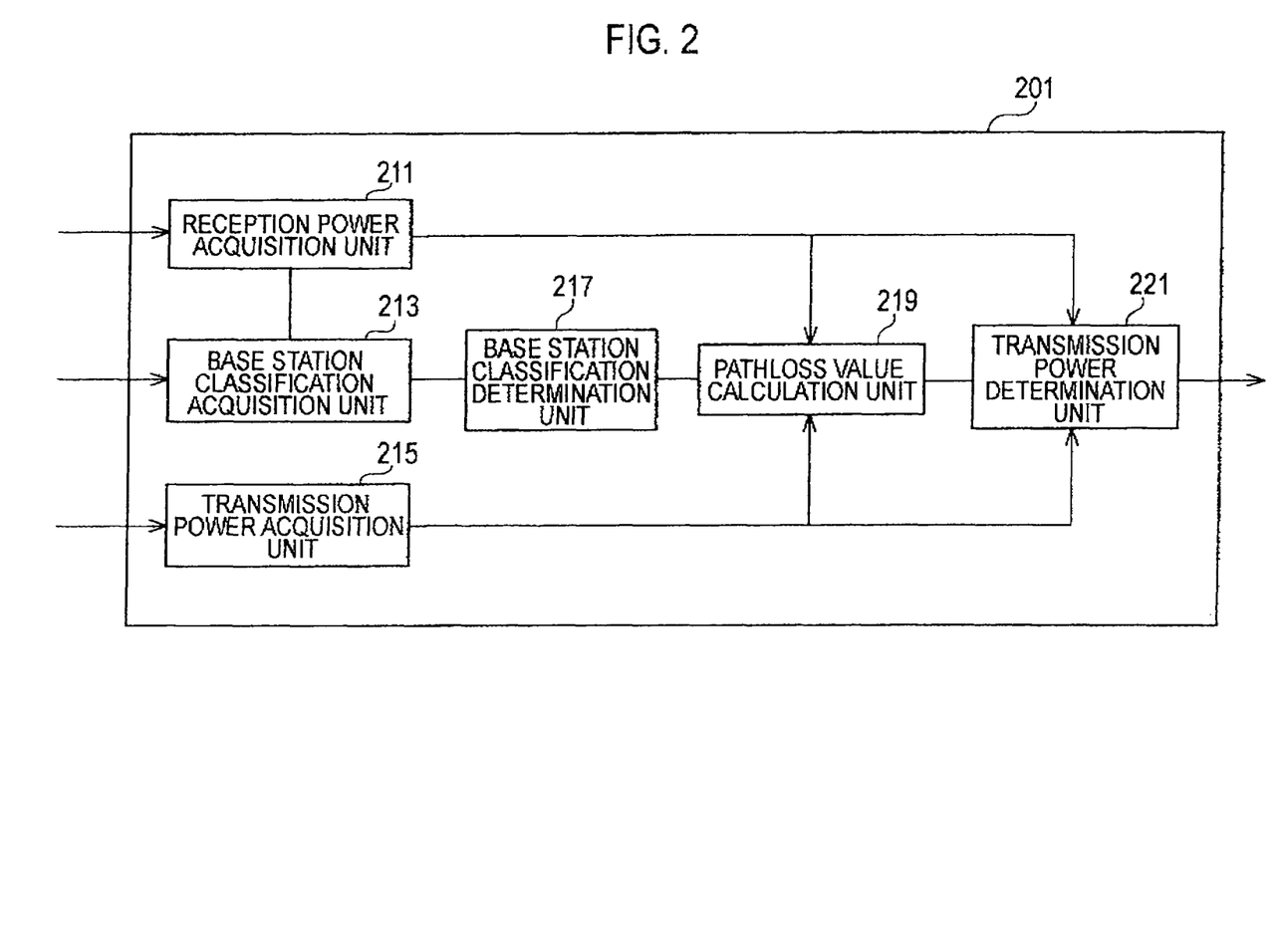
FIG. 2 is a functional block configuration diagram of a base station 201 (small base station) according to the embodiment of the present invention.

FIG. 2 is a functional block configuration diagram of the base station 201 configuring a small base station in this embodiment. It is noted that the base station 200 and the base station 202 include a configuration similar to that of the base station 201.

As illustrated in FIG. 2, the base station 201 includes a reception power acquisition unit 211, a base station classification acquisition unit 213, a transmission power acquisition unit 215, a base station classification determination unit 217, a pathloss value calculation unit 219, and a transmission power determination unit 221.

The reception power acquisition unit 211 acquires a reception power of a radio signal from different small base stations (base station 200 and base station 202) or a general base station (base station 203 and base station 204), which can be received by the base station 201.

Specifically, the reception power acquisition unit 211 acquires a reception power of a common control channel transmitted by the base station. In this embodiment, the mobile communication system complies with an LTE scheme, as described above, and therefore, a Reference Signal is used as the common control channel.

The base station classification acquisition unit 213 acquires a classification of the base station to which the common control channel acquired by the reception power acquisition unit 211 is transmitted. Specifically, the base station classification acquisition unit 213 can acquire a base station classification (small base station or general base station) included in broadcast information transmitted from the base station. It is noted that the broadcast information is transmitted via the common control channel, for example.

Alternately, the base station classification acquisition unit 213 can acquire a cell ID assigned to each base station, as the base station classification. That is, it may be configured to determine the base station classification by assigning a cell ID of a different numbering system to the small base station and the general base station.

The transmission power acquisition unit 215 acquires the transmission power of a common control channel in the base station to which the reception power acquisition unit 211 transmits the common control channel by which the reception power is acquired, Specifically, the transmission power acquisition unit 215 can acquire a transmission power value included in the broadcast information transmitted from the base station. Alternately, the transmission power acquisition unit 215 may inquire the base station of the transmission power value of the common control channel.

The base station classification determination unit 217 determines one of the different small base station and the general base station which transmits the radio signal (specifically, common control channel) acquired by the reception power acquisition unit 211. Specifically, the base station classification determination unit 217 determines the base station that transmits the common control channel is whether the small base station (Home eNodeB) or the general base station (eNodeB), based on the base station classification acquired by the base station classification acquisition unit 213.

The pathloss value calculation unit 219 calculates a pathloss value (propagation loss) of the common control channel transmitted by the different small base station. Specifically, when it is determined by the base station classification determination unit 217 that the common control channel that the reception power acquisition unit 211 acquires the reception power is transmitted from the different small base station, the pathloss value calculation unit 219 calculates the pathloss value between the different small base station and the its own station (base station 201), based on a difference between the transmission power of the common control channel from the different small base station and the reception power acquired by the reception power acquisition unit 211, of the common control channel from the different small base station (for example, base station 200).

The transmission power determination unit 221 determines the transmission power of the common control channel transmitted by the base station 201. Specifically, the transmission power determination unit 221 determines the transmission power of the common control channel transmitted by the base station 201, based on the pathless value calculated by the pathloss value calculation unit 219.

When it is determined by the base station classification determination unit 217 that the received common control channel is transmitted from the general base station, the transmission power determination unit 221 determines the transmission power of the radio signal transmitted by the base station 201 based on the reception power of the common control channel from the general base station acquired by the reception power acquisition unit 211.

Moreover, in this embodiment, the transmission power determination unit 221 determines the smaller value of the transmission power of the common control channel from the base station 201 determined based on the pathless value and the transmission power of the common control channel from the base station 201 determined based on the reception power of the common control channel from the general base station, as the transmission power of the common control channel transmitted by the base station 201.

(3) Operation of Small Base Station

Figure 3:
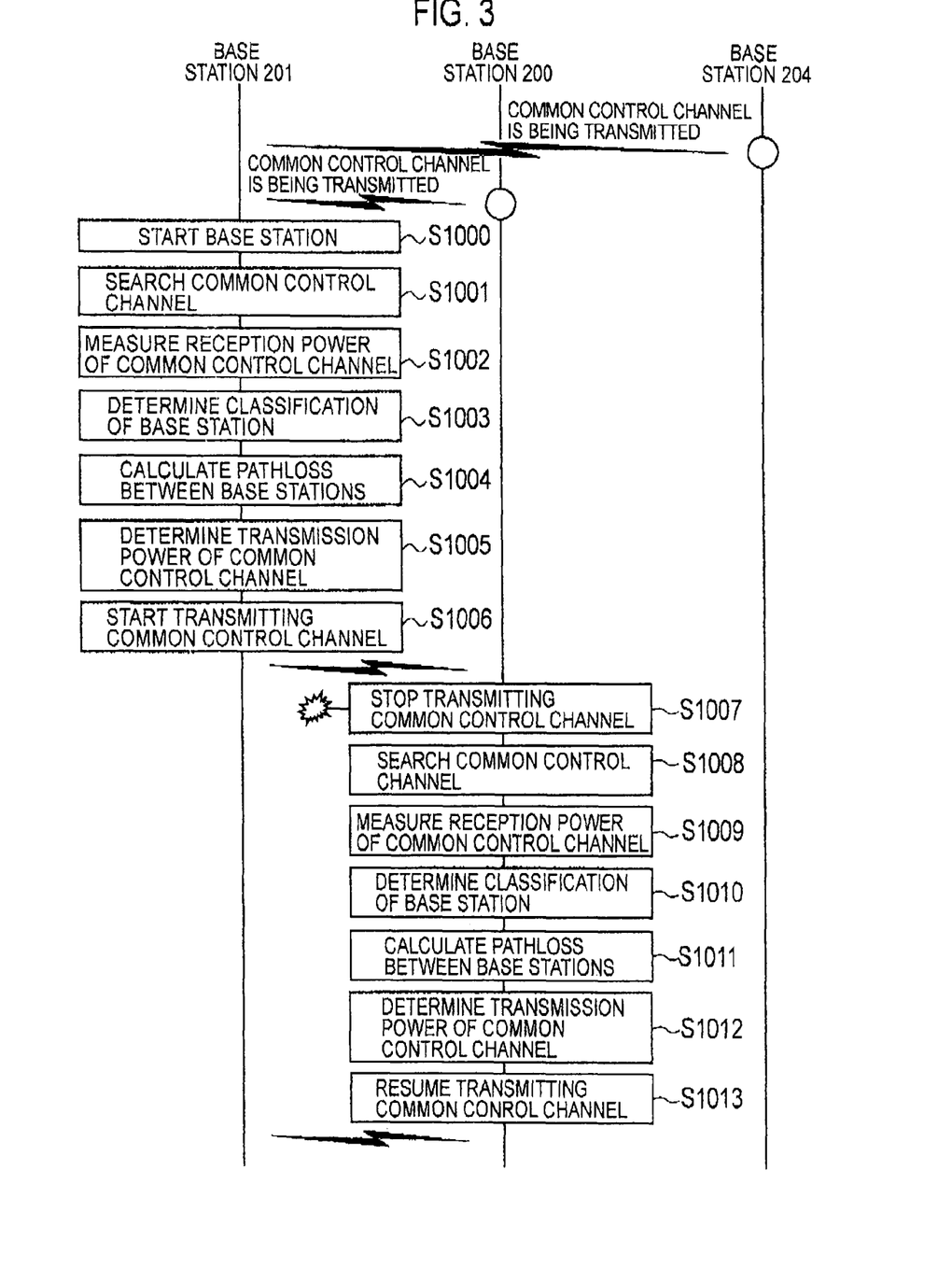
FIG. 3 is a chart illustrating an entire operation sequence of a base station 201 according to the embodiment of the present invention.
Figure 4:
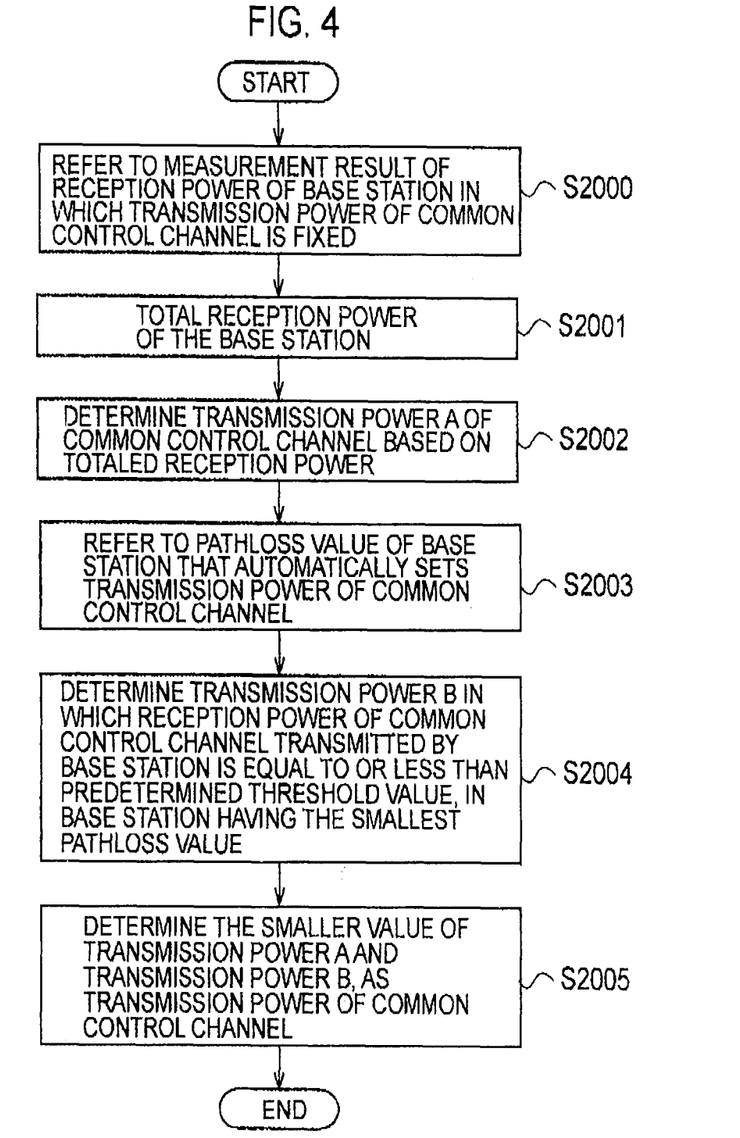
FIG. 4 is a chart illustrating a transmission power determination flow of a common control channel by a base station 201 according to the embodiment of the present invention.

Next, an operation example of the base station 201 configuring the small base station in this embodiment will be explained. FIG. 3 illustrates an entire operation sequence of the base station 201. FIG. 4 illustrates the transmission power determination flow of the common control channel by the base station 201.

(3. 1) Entire Operation Sequence of Base Station 201

FIG. 3 illustrates an operation sequence of the base station 201 when the different small base stations (base stations 200, 202 to 204) are already in operation and the base station 201, which is a small base station, is newly installed in an area adjacent to a cover area of the base station 200 and a cover area of the base station 204. When the base station 201 is installed in the area adjacent to the cover area of the base station 200 and the cover area of the base station 204, the base station 201 executes a starting operation (step S1000).

Upon completion of the starting operation, the base station 201 searches the common control channel (Reference Signal) transmitted by the base station located around the base station 201, and attempts to receive the common control channel (step S1001).

In this case, it is assumed that the base station 201 has been able to receive the common control channels transmitted by the base station 200 (small base station) and the base station 204 (general base station). The base station 201 measures the reception power of the common control channel (step S1002).

Herein, the base station 201 acquires the cell ID included in the broadcast information transmitted from the base station 200 and the base station 204 so as to determine the classification of the base station. When the base station classification is the small base station based on the cell ID, the base station 201 determines that the base station is a base station that automatically sets the transmission power of the common control channel (step S1003).

In this embodiment it is assumed that the base stations 200 to 202, which are small base stations, are able to automatically set the transmission power of the common control channel. On the other hand, it is assumed that in the base station 203 and the base station 204, which are general base stations, the transmission power of the common control channel is fixed.

The base station 201 acquires the transmission power of the common control channel transmitted by the base station 200. It is noted that the base station 201 can acquire the transmission power of the common control channel based on the broadcast information, etc., from the base station 200, as described above. The base station 201 calculates the pathloss value between the base station 200 and the base station 201, based on the difference between the transmission power of the common control channel from the base station 200 and the reception power of the common control channel in the base station 201 (step S1004). Specifically, the difference is regarded as the pathloss value.

The base station 201 determines the transmission power of the common control channel transmitted by the base station 201, based on the calculated pathloss value (step S1005). A specific method of determining a transmission power is described later.

The base station 201 starts transmitting the common control channel by the determined transmission power (step S1006).

The different small base station (in this case, the base station 200) that can automatically set the transmission power of the common control channel regularly stops the transmission of the common control channel (step S1007).

The base station 200 executes processes similar to those in the aforementioned steps S1001 to S1005 in steps S1008 to S1012, respectively.

The base station 200 resumes the transmission of the common control channel upon completion of the process up to step S1012 (step S1013).

(3. 2) Transmission Power Determination Flow of Common Control Channel by Base Station 201

As illustrated in FIG. 4, the base station 201 refers to a measurement result of the reception power of the common control channel transmitted by the base station (in this case, the base station 204 only) in which the transmission power of the common control channel is fixed (step S2000).

When there are a plurality of measurement results, the base station 201 totals the reception power, based on the measurement results (step S2001).

The base station 201 determines a transmission power A of the common control channel transmitted by the base station 201, based on a value of the totaled reception power (step S2002).

Figure 5:
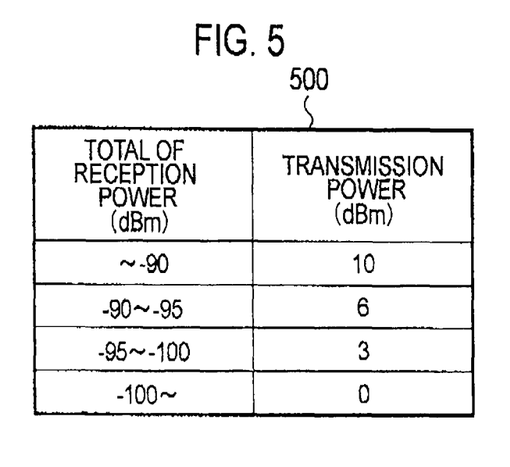
FIG. 5 is a diagram illustrating one example of a transmission power determination table 500 according to the embodiment of the present invention.

In this case, FIG. 5 illustrates one example of a transmission power determination table 500 regulating a correspondence relationship between the total value of the reception power and the transmission power. As illustrated in FIG. 5, on the transmission power determination table 500, the total value of the reception power of the common control channels of the peripheral base stations in the base station 201 corresponds to the transmission power of the common control channel transmitted by the base station 201. The total value of the reception power includes a constant range (in an example illustrated in FIG. 5, 5 to 10 dB).

Instead of the transmission power determination table 500, the base station 201 may determine the transmission power A by using the following Equation 1.

$$Rv+\alpha=Tr\#A \quad \text{(Equation 1)}$$

In this case, Rv denotes a reception power, Tr denotes a transmission power, and α denotes a conversion offset value. That is, the transmission power determination unit 221 of the base station 201 may determine the transmission power of the common control channel transmitted by the base station 201, by adding the conversion offset value a (predetermined offset value) to the reception power of the common control channel from the general base station acquired by the reception power acquisition unit 211.

The base station 201 refers to the pathloss value with the base station that automatically sets the transmission power of the common control channel (step S2003). As described above, it is noted that the pasthloss value is a difference between the transmission power of the common control channel from the peripheral small base stations and the reception power of the common control channel in the base station 201.

The base station 201 determines a transmission power B of the common control channel transmitted by the base station 201 based on the calculated pathloss value (step S2004). Specifically, when there are a plurality of the different small base stations that the base station 201 can receive, the transmission power determination unit 221 of the base station 201 determines the transmission power of the common control channel transmitted by the base station 201 so that the reception power of the common control channel from the base station 201 in a different small base station having the smallest pathloss value is equal to or less than a predetermined threshold value.

Figure 6:
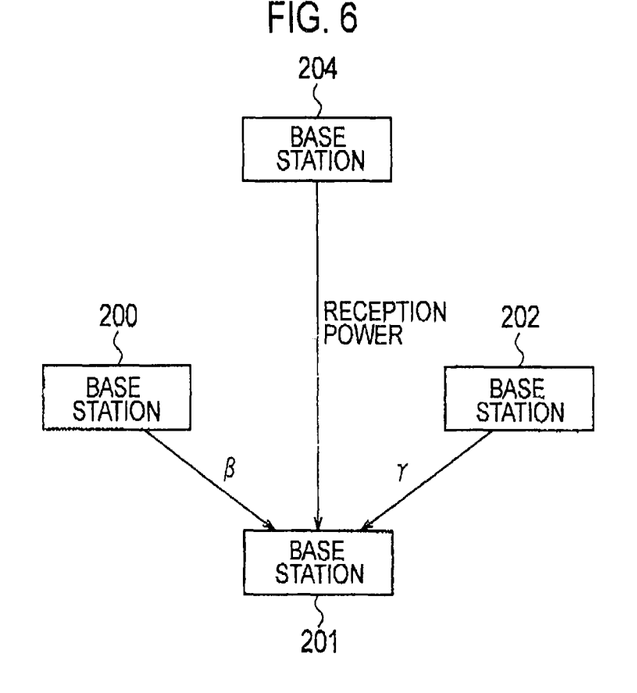
FIG. 6 is a diagram schematically illustrating a relationship between pathloss value with a different small base station (base stations 200 and 202) in the base station 201 according to the embodiment of the present invention, and a reception power of a common control channel from a general base station (base station 204).

FIG. 6 schematically illustrates a relationship between the pathloss value with the different small base stations (base stations 200 and 202) in the base station 201, and the reception power of the common control channel from the general base station (base station 204).

As illustrated in FIG. 6, the base station 201 calculates a pathloss value β with the base station 200 and a pathloss value γ with the base station 202 so as to acquire β and γ. In this case, it is assumed that β<γ. The base station 201 determines the transmission power B by using the base station 200 having the smallest pathloss value as a reference. Specifically, the base station 201 determines the transmission power B so that the reception power in the base station 200 of the common control channel transmitted from the base station 201 is equal to or less than a predetermined threshold value (T) by using Equation 2.

$$\text{Min}\{\beta,\gamma,\ldots\}+T=Tr\#B \quad \text{(Equation 2)}$$

In this case, β and γ denote a pathloss value (dB), T denotes a reception power threshold value, and Tr denotes a transmission power. Thus, when the transmission power B is determined by using the base station 200 having the smallest pathloss value as a reference, it is possible to reduce an interference amount for the base station 202 having a relatively large pathloss value to a predetermined value or less.

Subsequently, as illustrated in FIG. 4, the base station 201 determines the smaller of the transmission power A determined in step S2002 and the transmission power B determined in step S2004, as the transmission power of the common control channel transmitted by the base station 201 (step S2005).

(4) Operation and Effect

According to the aforementioned base station 201, when the received common control channel is transmitted from a different small base station, the transmission power of the common control channel transmitted by the base station 201 is determined based on the pathloss value between the different small base station and the base station 201. Specifically, the transmission power of the common control channel transmitted by the base station 201 is determined so that the reception power of the common control channel from the base station 201 in a different small base station having the smallest pathloss value is equal to or less than a predetermined threshold value.

Thus, it is possible to avoid a problem, which is inherent in the conventional self configuration, that the transmission level of the common control channel transmitted by the base station or the peripheral base station gradually increases in the end and the interference of the radio signal between the base stations can rather increase.

Further, in this embodiment, between the small base stations, even when the transmission power of the common control channel has been determined based on the pathloss value, upon receipt of the common control channel from the general base stations (the base station 203 and the base station 204) of which the transmission power is fixed and which frequently has a transmission power larger than that of the small base station, the transmission power of the common control channel transmitted by the base station 201 is determined based on the reception power of the common control channel, and therefore, it is possible to determine an appropriate transmission power of the common control channel in which the interference with the general base station, in addition, between the small base stations, can be suppressed.

On the other hand, if the transmission power of the common control channel transmitted by the base station 201 is determined based only on the reception power of the common control channel from the general base station, then the base station surrounded by the small base station configured to automatically set the transmission power of the common control channel finds it difficulty in raising the transmission power of the common control channel, and therefore, it is probable that the service area may be shrunk as compared to a base station not surrounded by the small base station. That is, the service area is unequally provided depending on the base station.

To solve this, in this embodiment, between the base station and the small base station, the transmission power of the common control channel is determined based on the pathloss value, as described above, and in this way, the reception power of the different small base station becomes equal to or less than a predetermined threshold value (T), for the both base stations, resulting in solving a problem of service area inequality.

In this embodiment, the smaller value of the transmission power of the common control channel determined based on the pathloss value and the transmission power of the common control channel determined based on the reception power of the common control channel from the general base station is used. Thus, it is possible to secure the appropriate service area or communication quality while effectively suppressing the interference between the peripheral base stations.

(5) Other Embodiments

Thus, the content of the present invention is disclosed through the above embodiment. However, it should not be interpreted that the statements and drawings constituting a part of the present disclosure limit the present invention. From this disclosure, a variety of alternate embodiments will be apparent to one skilled in the art.

Figure 7:
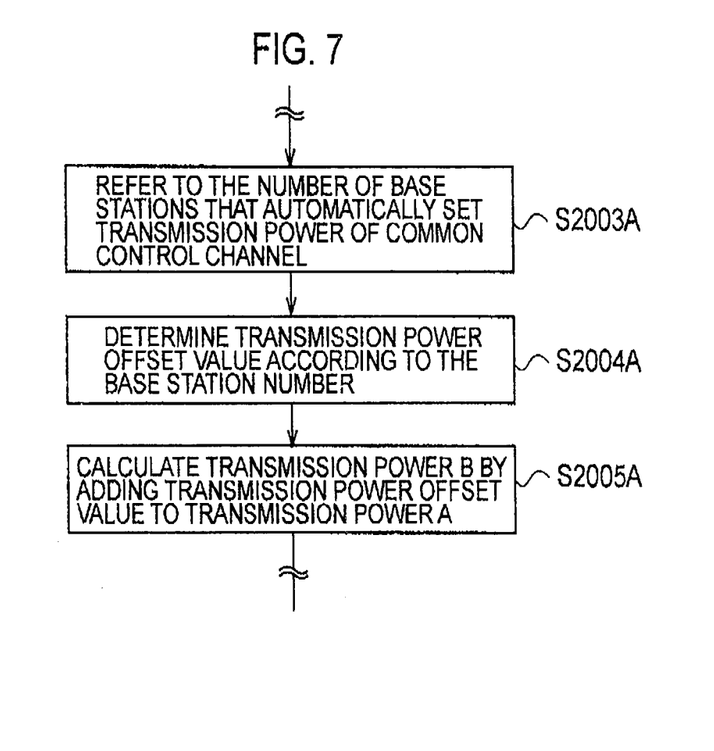
FIG. 7 is a chart illustrating a transmission power determination flow according to a modification of the present invention.

FIG. 7 illustrates a transmission power determination flow according to a modification of the present invention. Specifically, steps S2003A to S2005A illustrated in FIG. 7 are executed instead of the steps S2003 to S2005 illustrated in FIG. 4.

The base station 201 refers to the number of base stations that automatically set the transmission power of the common control channel (step S2003A). It is noted that the base station 201 acquires the number of base stations based on the receivable common control channel.

Figure 8:
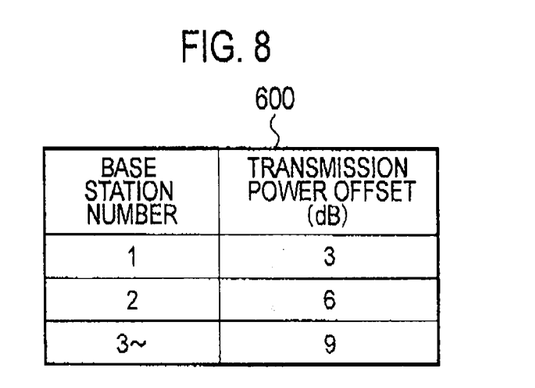
FIG. 8 is a diagram illustrating one example of a transmission power offset table 600 according to the modification of the present invention.

The base station 201 determines a transmission power offset value (fixed offset value) according to the acquired base station number (step S2004A). FIG. 8 illustrates one example of a transmission power offset table 600 regulating the correspondence relationship between the base station number and the transmission power offset value. The base station 201 determines the transmission power offset value based on the transmission power offset table 600.

The base station 201 calculates the transmission power B by adding the transmission power offset value to the transmission power A determined in step S2002 (see FIG. 4). The base station 201 determines the transmission power B as the common control channel transmitted by the base station 201.

Moreover, in the aforementioned embodiment, the base station 201 executes all the processes relating to the determination of the transmission power of the common control channel; however, one portion of the processes may be executed in the base station controller 100. That is, it may be possible to configure a transmission power control system by the small base station and the base station controller 100.

Further, in the case of W-CDMA scheme, the base station controller 100 may determine the transmission power of the common control channel transmitted by the small base station, based on the reception power of the peripheral base station received by the small base station or the classification of the base station. Moreover, in the case of W-CDMA scheme, it may be possible to identify the classification of the base station based on a scramble code assigned to the base station.

In the aforementioned embodiment, the smaller value of the transmission power of the common control channel determined based on the pathloss value and the transmission power of the common control channel determined based on the reception power of the common control channel from the general base station is used; however this process is not necessarily needed. Upon receipt of the common control channel from the general base station, the transmission power of the common control channel transmitted by the base station 201 is determined based on the reception power of the common control channel; however, this process is not necessarily needed.

Thus, needless to say, the present invention includes various embodiments not described herein. Therefore, the technical range of the present invention is to be defined only by the inventive specific matter according to the adequate claims from the above description.

What is claimed is:

1. A transmission power determination system configured to control a transmission power of a radio signal transmitted by a small base station in a mobile communication network including a general base station forming a predetermined cell and the small base station forming a small cell smaller in size than the predetermined cell, the transmission power determination system comprising:
   a reception power acquisition unit configured to acquire a reception power of a radio signal from one of a different small base station or the general base station, which can be received by the small base station;
   a determination unit configured to determine one of the different small base station and the general base station which transmits the radio signal acquired by the reception power acquisition unit;
   a pathloss value calculation unit configured to calculate, when it is determined by the determination unit that the radio signal is transmitted from the different small base station, pathloss value between the different small base station and the small base station based on a difference between a transmission power of the radio signal from the different small base station and the reception power of the radio signal from the different small base station acquired by the reception power acquisition unit; and
   a transmission power determination unit configured to determine the transmission power of the radio signal transmitted by the small base station, based on the pathloss value calculated by the pathloss value calculation unit.

2. The transmission power determination system according to claim 1, wherein
   the transmission power determination unit determines the transmission power of the radio signal transmitted by the small base station based on the reception power of the radio signal from the general base station acquired by the reception power acquisition unit, when it is determined by the determination unit that the radio signal is transmitted from the general base station.

3. The transmission power determination system according to claim 2, wherein
   the transmission power determination unit determines, as the transmission power of the radio signal transmitted by the small base station, a transmission power having a smaller value, of the transmission power of the radio signal from the small base station determined based on the pathloss value and the transmission power of the radio signal from the small base station determined based on the reception power of the radio signal from the general base station.

4. The transmission power determination system according to claim 1, wherein
the transmission power determination unit determines the transmission power of the radio signal transmitted by the small base station so that a reception power of the radio signal from the small base station in a different small base station having the smallest pathloss value is equal to or less than a predetermined threshold value, when there are a plurality of different small base stations that can be received by the small base station.

5. The transmission power determination system according to claim 2, wherein
the transmission power determination unit determines the transmission power of the radio signal transmitted by the small base station by adding a predetermined offset value to the reception power of the radio signal from the general base station acquired by the reception power acquisition unit.

6. A base station configured to control a transmission power of a radio signal transmitted by a small base station in a mobile communication network including a general base station forming a predetermined cell and the small base station forming a small cell smaller in size than the predetermined cell, the base station comprising:
a reception power acquisition unit configured to acquire a reception power of a radio signal from one of a different small base station and the general base station, which can be received by the small base station;
a determination unit configured to determine one of the different small base station and the general base station which transmits the radio signal acquired by the reception power acquisition unit;
a pathloss value calculation unit configured to calculate, when it is determined by the determination unit that the radio signal is transmitted from the different small base station, pathloss value between the different small base station and the small base station based on a difference between a transmission power of the radio signal from the different small base station and a reception power of the radio signal from the different small base station acquired by the reception power acquisition unit; and
a transmission power determination unit configured to determine the transmission power of the radio signal transmitted by the small base station, based on the pathloss value calculated by the pathloss value calculation unit.

7. A transmission power control method of controlling a transmission power of a radio signal transmitted by a small base station in a mobile communication network including a general base station forming a predetermined cell and the small base station forming a small cell smaller in size than the predetermined cell, the method comprising:
a step of acquiring a reception power of a radio signal from one of a different small base station and the general base station, which can be received by the small base station;
a step of determining one of the different small base station and the general base station which transmits the acquired radio signal is transmitted;
a step of calculating, when it is determined that the radio signal is transmitted from the different small base station, a pathloss value between the different small base station and the small base station based on a difference between a transmission power of the radio signal from the different small base station and an acquired reception power of the radio signal from the different small base station; and
a step of determining the transmission power of the radio signal transmitted by the small base station, based on the calculated pathloss value.

* * * * *